US007032136B1

(12) United States Patent  (10) Patent No.: US 7,032,136 B1
Gajjar et al.  (45) Date of Patent: Apr. 18, 2006

(54) AUTO REGRESSION TEST FOR NETWORK-BASED STORAGE VIRTUALIZATION SYSTEM

(75) Inventors: Kumar Gajjar, San Jose, CA (US); Robert Robbins, Sunnyvale, CA (US); Ranjit Ghate, Oakland, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 795 days.

(21) Appl. No.: 10/238,932

(22) Filed: Sep. 9, 2002

Related U.S. Application Data

(60) Provisional application No. 60/317,817, filed on Sep. 7, 2001.

(51) Int. Cl.
*G06F 11/00* (2006.01)

(52) U.S. Cl. .......................................... 714/43; 714/42
(58) Field of Classification Search ................. 714/43, 714/42, 27
See application file for complete search history.

(56) References Cited

U.S. PATENT DOCUMENTS

| 5,455,834 | A | 10/1995 | Chang et al. |
| 5,668,968 | A | 9/1997 | Wu |
| 5,787,494 | A | 7/1998 | DeLano et al. |
| 6,067,608 | A | 5/2000 | Perry |
| 6,208,543 | B1 | 3/2001 | Tupuri et al. |
| 6,421,711 | B1 | 7/2002 | Blumenau et al. |
| 6,442,666 | B1 | 8/2002 | Stracovsky |
| 6,453,404 | B1 | 9/2002 | Bereznyi et al. |
| 6,640,278 | B1 | 10/2003 | Nolan et al. |
| 6,754,853 | B1* | 6/2004 | DeKoning et al. ............ 714/42 |
| 6,839,746 | B1* | 1/2005 | Muthiyan et al. ........... 709/220 |
| 2002/0026558 | A1* | 2/2002 | Reuter et al. ................ 711/114 |
| 2002/0161983 | A1* | 10/2002 | Milos et al. ................. 711/202 |
| 2002/0169869 | A1* | 11/2002 | Fainer et al. ................ 709/224 |
| 2002/0170004 | A1* | 11/2002 | Parrett et al. ................. 714/43 |
| 2003/0037127 | A1* | 2/2003 | Shah et al. .................. 709/220 |

FOREIGN PATENT DOCUMENTS

EP 0 380 854 A2 9/1989

OTHER PUBLICATIONS

IBM, IBM Network Processor (IBM32NPR161EPXCAC133), Product Overview, Nov. 4, 1999, pp. 1-17.
Montague et al., Virtualizing the SAN, Morgan Keegan & Company, Inc., Jul. 5, 2000, pp. 1-20.

* cited by examiner

*Primary Examiner*—Scott Baderman
(74) *Attorney, Agent, or Firm*—Blakely, Sokoloff, Taylor & Zafman LLP

(57) ABSTRACT

An apparatus and method for testing a network-based storage virtualization system. A tester is connected to a host side of a storage virtualization system. The tester provides test scripts to the storage virtualization system to test I/O and other operations. A separate link, independent of said storage virtualization system, is provided to a storage side of said storage virtualization system to allow verification of the correct translation from virtual to physical independent of the data path used by the virtualization system. Thus, the tester verifies, over the separate link, the physical configuration of VLUNs and data written to the VLUNs by the tester on storage devices.

9 Claims, 6 Drawing Sheets

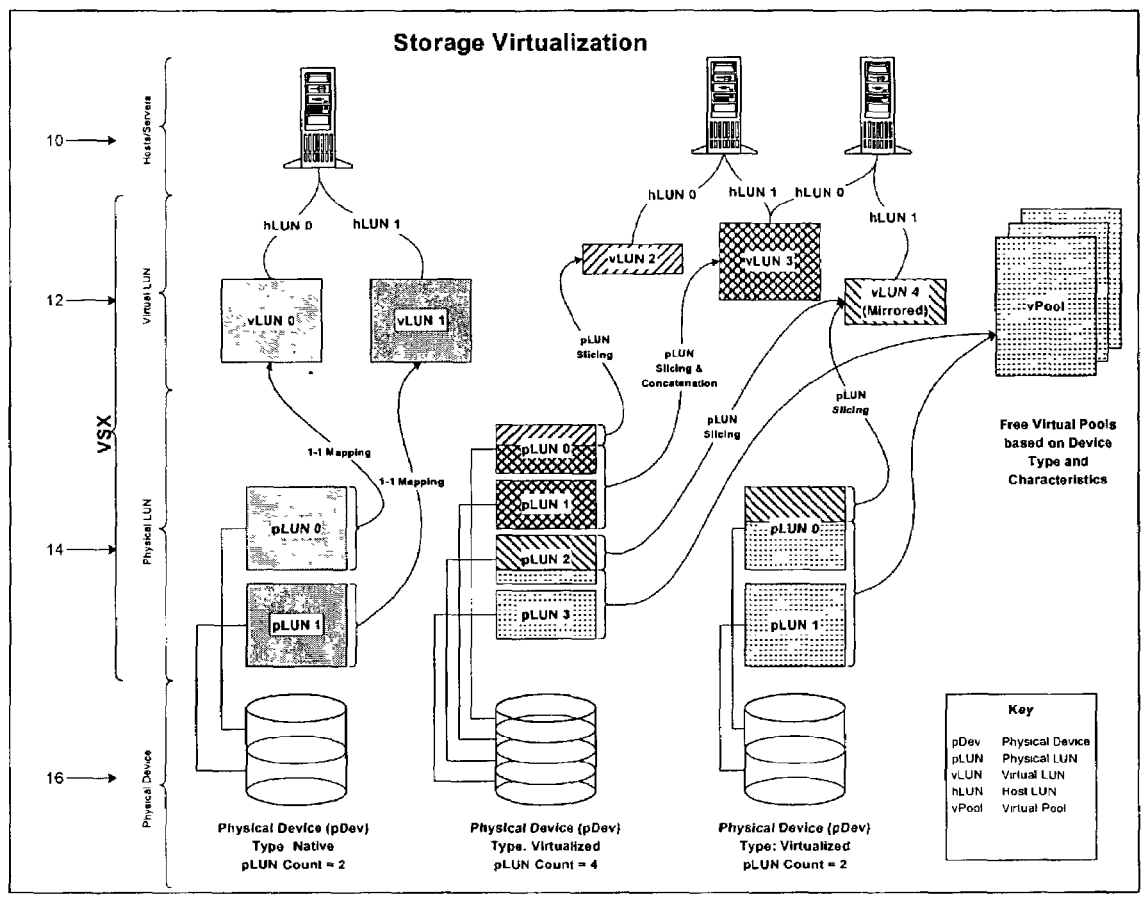
Figure 1: Storage Virtualization

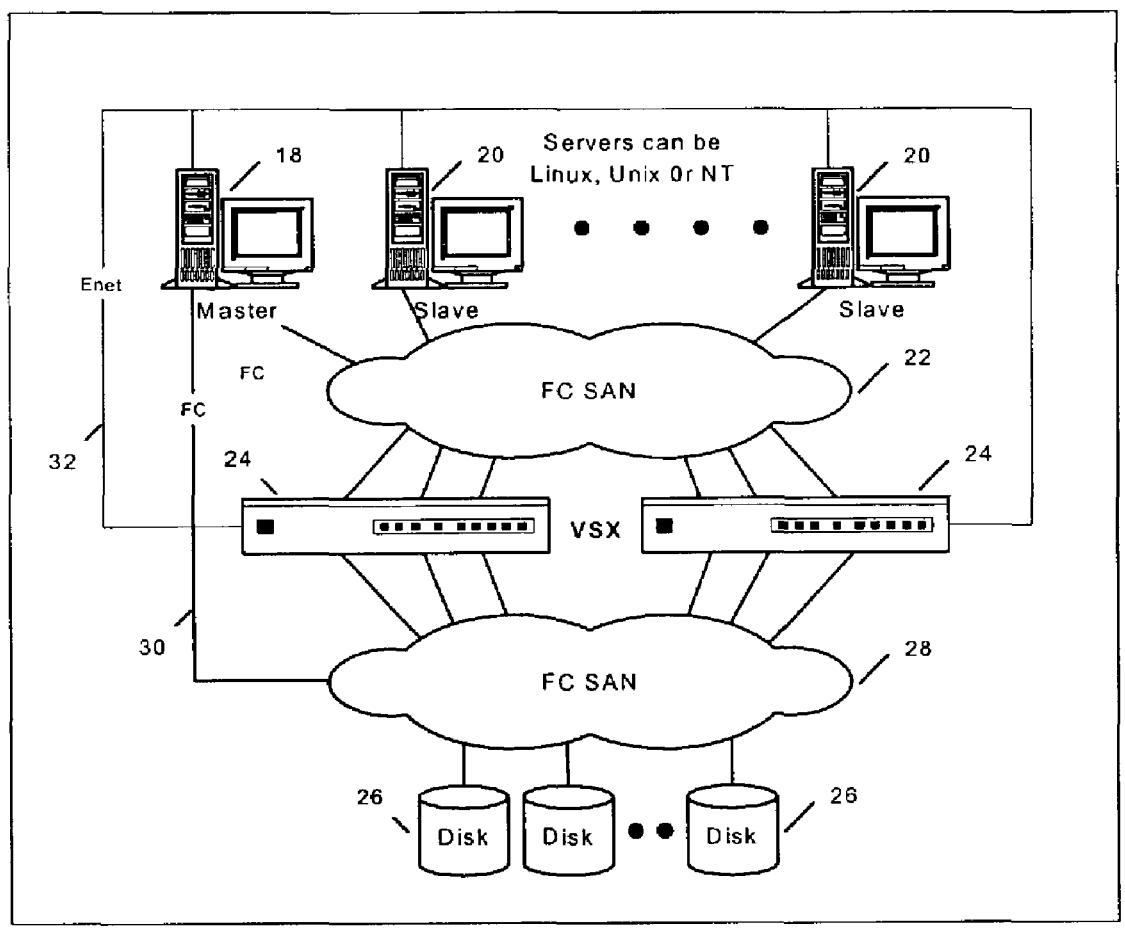
Figure 2: VSX Tester Configuration

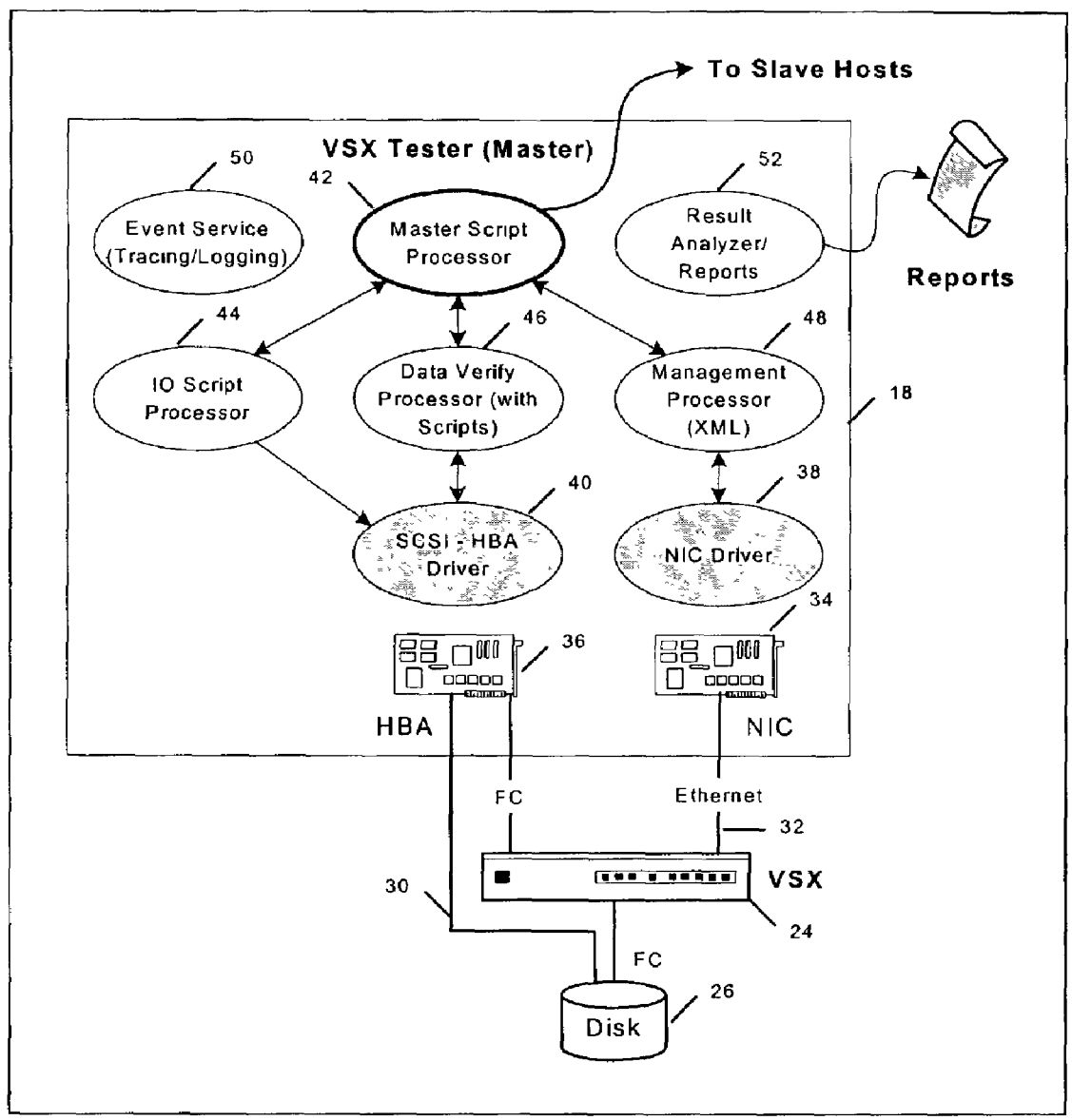
Figure 3: VSX Tester - Master Components

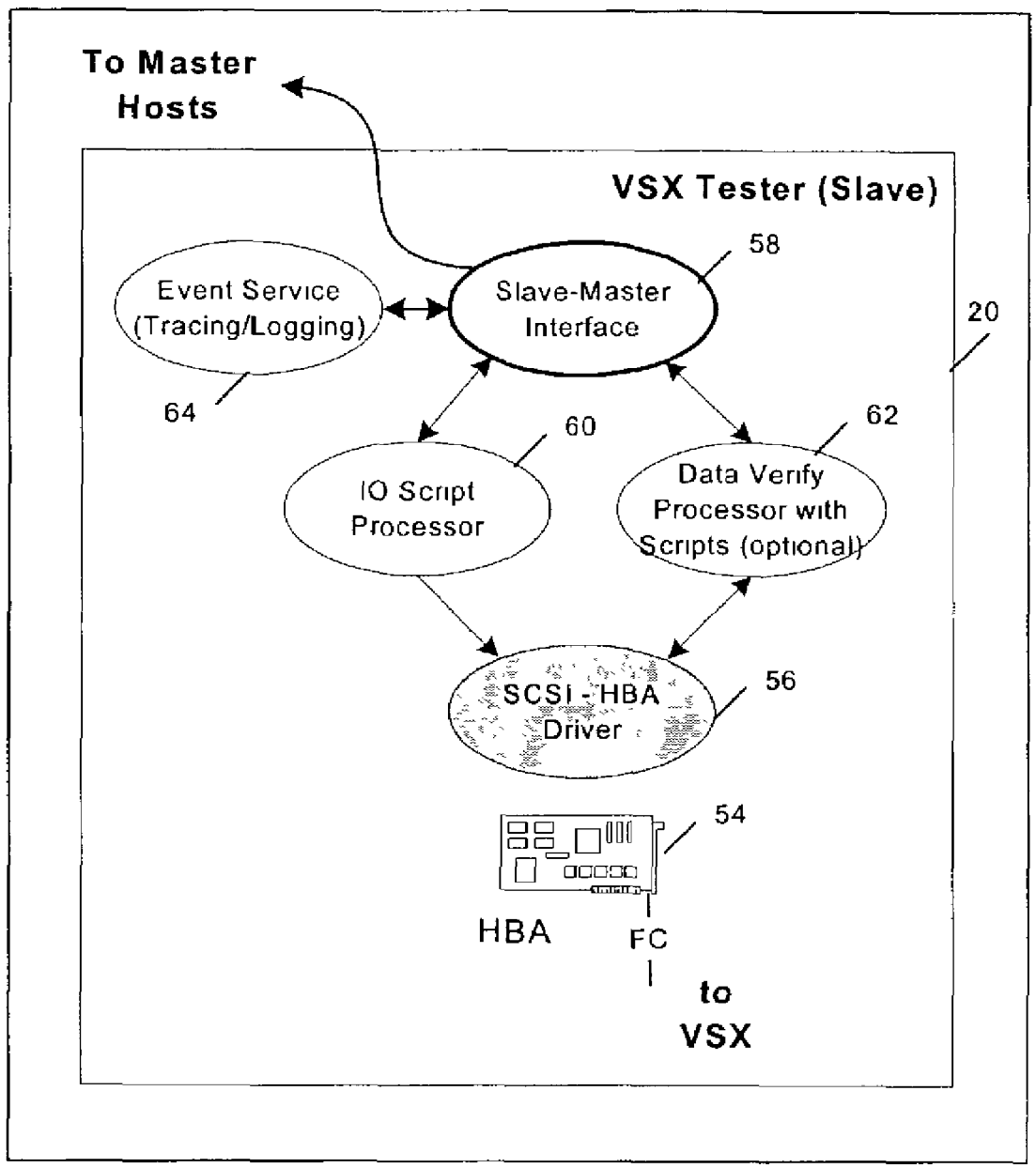
Figure 4: VSX Tester - Slave Components

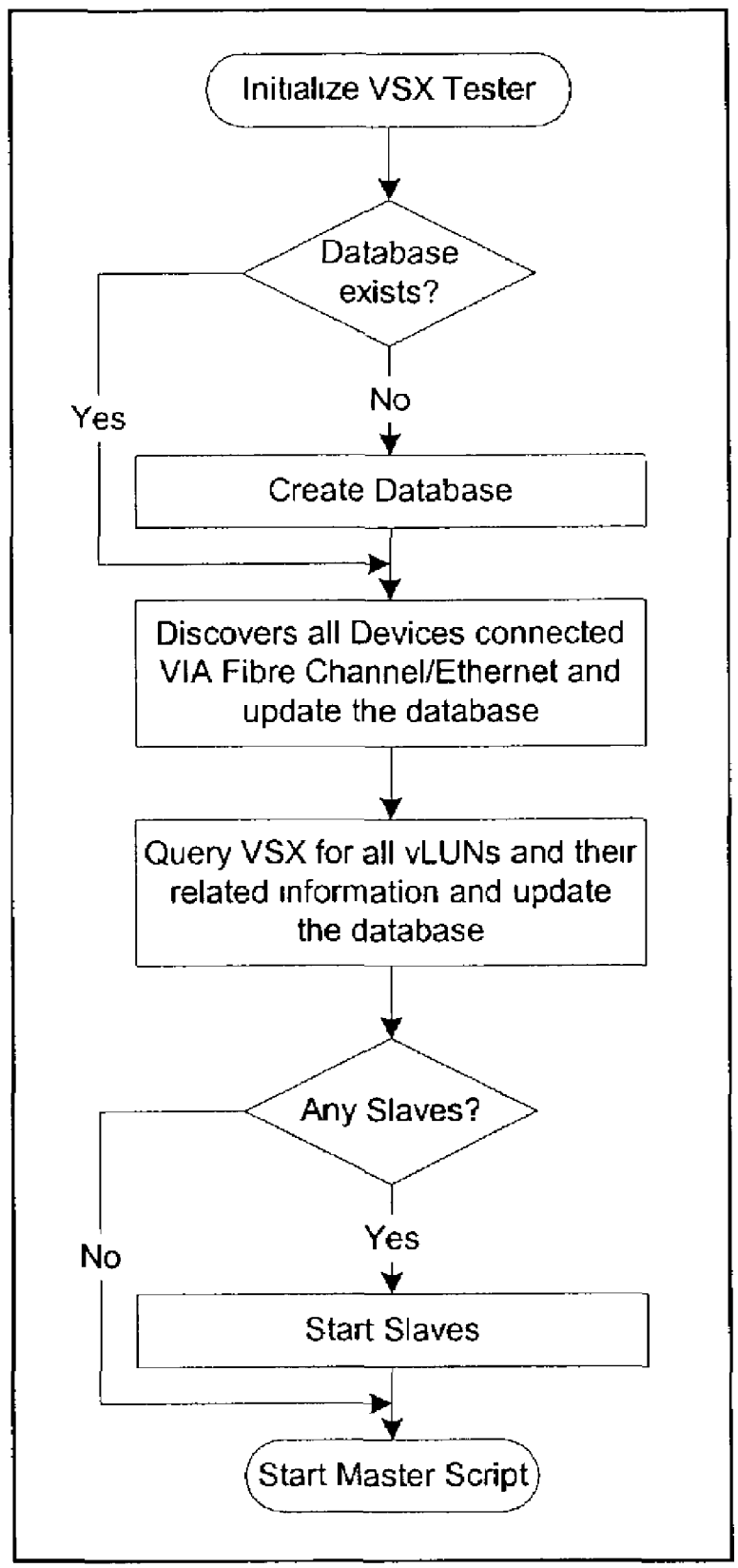
Figure 5: Master Initialization flow

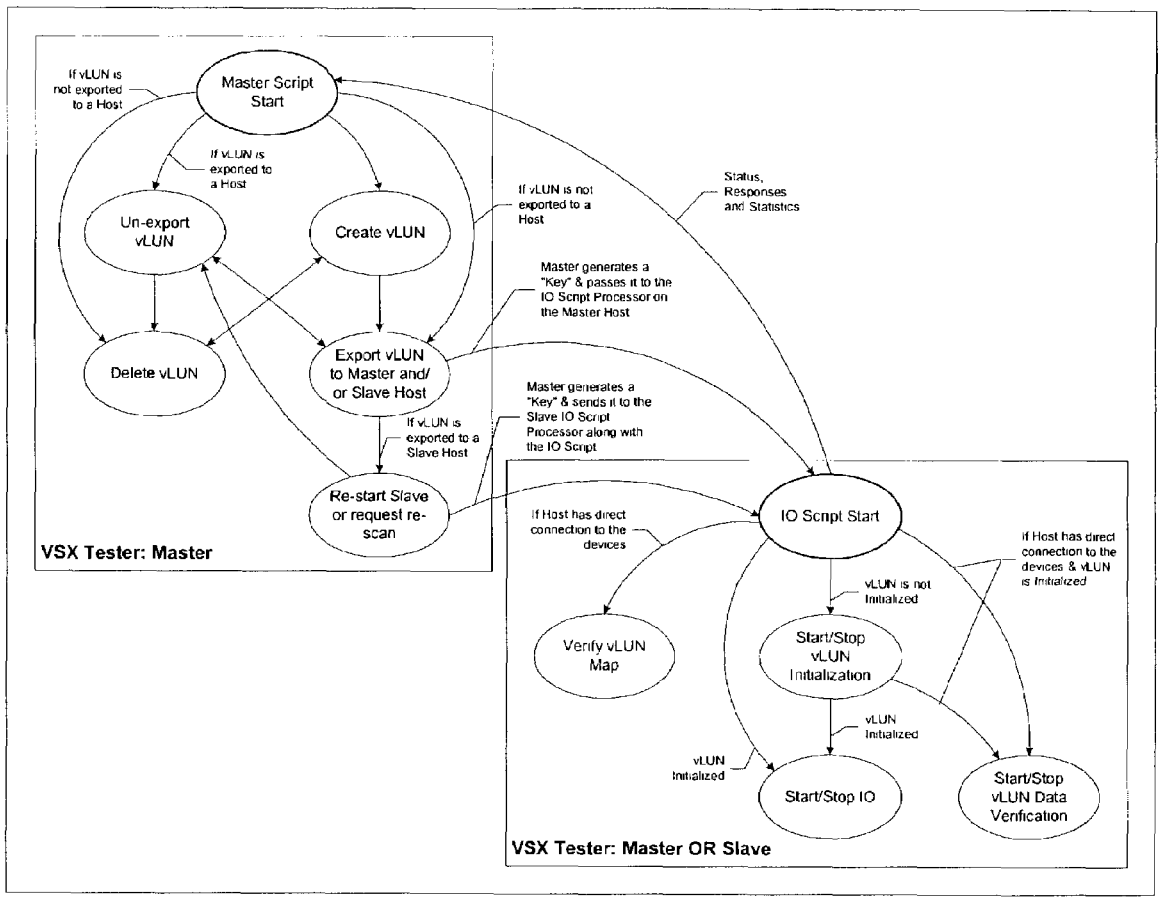
Figure 6: vLUN States

AUTO REGRESSION TEST FOR NETWORK-BASED STORAGE VIRTUALIZATION SYSTEM

CROSS-REFERENCES TO RELATED APPLICATIONS

This application claims priority to provisional application Ser. No. 60/317,817 filed Sep. 7, 2001, entitled "Method and Apparatus for Processing Fiber Channel Frames at Wire Speed."

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to testers, in particular testers for virtualized Storage Area Networks (SAN).

The priority application describes a Confluence product, code named VSX, which is a networked based Storage Virtualization System that virtualizes all the storage space off storage devices that are connected behind it and aggregates the storage space into a virtual pool(s). VSX also provides services to carve out the virtual pool into volumes of any size. This may include slicing a larger physical LUN (Logical Unit Number) to create a smaller Virtual LUN (vLUN) or concatenation of more than 1 physical LUNs to create a large vLUN, etc. FIG. 1 shows a number of hosts 10 assigned VLUNs 12. The VLUNs are made up of LUNs 14, which are stored on physical devices 16.

Existing testers are not designed for a networked based storage virtualization system. These testers verify data using the same paths that were used to write data in the first place—thus the tester will not be able to catch issues with physical re-mapping of the data (which is what most of the Storage Virtualizations devices do) through the same path.

These testers typically verify the volumes as they are presented to them by the volume manager and do not verify the physical layout of these volumes. These tester also require manual set-up of the test environment.

BRIEF SUMMARY OF THE INVENTION

The present invention provides an apparatus and method for testing a network-based storage virtualization system. A tester is connected to a host side of a storage virtualization system. The tester provides test scripts to the storage virtualization system to test I/O and other operations. A separate link, independent of said storage virtualization system, is provided to a storage side of said storage virtualization system to allow verification of the correct translation from virtual to physical independent of the data path used by the virtualization system. Thus, the tester verifies the physical configuration of data on storage devices over said separate link.

In one embodiment, a master tester is used, in conjunction with a number of slave testers. The slave testers receive a test script from the master tester, to provide test data from a connection different from a connection of said master tester to the storage virtualization system.

In one embodiment, the testing is automated. The tester initially determines the physical configuration of the virtualization storage system, including the locations of the storage devices and storage processors. A test script is then selected based on the determined configuration. The test script automatically tests all the different I/O paths, using a variety of SCSI commands for read, write, etc.

For a further understanding of the nature and advantages of the invention, reference should be made to the following description in conjunction with the accompanying drawings.

BRIEF DESCRIPTION OF THE DRAWINGS

FIG. 1 is a diagram of a storage virtualization system to be tested in accordance with the present invention.

FIG. 2 is a block diagram of the tester configuration of the present invention.

FIG. 3 is a diagram of the software modules in the master tester of an embodiment of the invention.

FIG. 4 is a diagram of the software modules in the slave tester of an embodiment of the invention.

FIG. 5 is a flow chart illustrating the master tester initialization flow in an embodiment of the invention.

FIG. 6 is a state diagram illustrating the states of the master and slave testers in an embodiment of the invention.

DETAILED DESCRIPTION OF THE INVENTION

The tester according to an embodiment of the invention, named the VSX Tester, automates the regression testing of a networked based Storage Virtualization System, VSX. The VSX Tester automates the entire test process that includes
(1) Creation/deletion of Virtual LUN (vLUN).
(2) Export/un-export vLUN(s) to the Storage Consumers (Servers).
(3) Initiate start/stop of the running IOs by a Storage Consumer.
(4) Verifies vLUN map.
(5) Verifies the data written to the vLUN(s) based on the key assigned to a Storage Consumer.
(6) Supports all general Operating Systems that are supported by VSX.
(7) Supports all Storage Devices that are supported by VSX.
(8) Supports all Host Bus Adapter that are supported by VSX.
(9) Supports any combinations of the end-devices that is Storage Consumers and Storage Devices.

FIG. 2 shows an overview of a VSX Tester configuration according to an embodiment of the present invention. The VSX Tester consists of a host 18 as "Master" and a number of "Slaves" 20. The master and slaves connect via fibre channel (FC) to a FC SAN 22, which is connected to the virtualization system, VSX 24. VSX 24 is connected to disks 26 through FC SAN 28.

A separate FC connection 30 connects master tester 18 directly to FC SAN 28, on the storage side of VSX 24. This provides an independent path to the physical disks 26, so that the tester can verify the LUN configurations without using the same data path through FC SAN 22 and VSX 24 used by the test routine to read and write the data. Also, a separate ethernet connection 32 is used by the master to communicate commands with VSX 24 and slaves 20.

The Master tester has a Master Script which orchestrate the entire test system. Slaves simply follow the Master's orders. The Master's direct connection 30 to the disk systems that are virtualized by the VSX is important in verifying that the volume mapping done by the VSX is correct. Optionally, Slaves may also have direct connections to the disk systems and may be responsible for verifying the vLUNs & their data. Or a completely separate server can be directly connected to the storage and run just the Data Verification processor.

The software components of a Master VSX Tester 18 are shown in FIG. 3. Also shown are the Network Interface Card (NIC) 34 and Host Bus Adapter 36. NIC Driver module 38 and SCSI-HBA Driver 40 are $3^{rd}$ Party Software packages. The master script processor module 42 controls three other modules: IO Script Processor 44, Data Verify Processor 46 and Management Processor 48. The master is responsible for verifying the vLUNs and it's data. Slaves can also be (optionally) used to verify the vLUN data. Also shown are an Event Service Module 50 and a Result Analyzer/Reports module 52.

The software components of a VSX Tester-Slave 20 are shown in FIG. 4. The HBA 54 is also shown. SCSI-HBA Driver 56 is a $3^{rd}$ Party Software package. A Slave-Master Interface module 58 for communicating scripts, commands and status between the master and the slave. The scripts are run by I/O Script Processor 60. The data written to the disks has a unique key to identify the slave. This key is a unique pattern, which in one embodiment includes a WWN of the slave tester, the volume ID of the LUN, a data pattern ID (corresponding to a particular data pattern to be written) and a time stamp. Optionally, a Data Verify Processor 62 can verify the vLUN data, using the same data path as the test scripts, or with a separate optional connection to the data storage, like the master direct connection 30.

Slave-Master Interface Module 58.

Interface module 58 allows interfacing with the Master Host. It interfaces with the IO Script Processor 60 to relay messages to and from the Master. It interfaces with the Data Verify Processor 62 to relay messages to and from the Master. It interfaces to the Event Service 64 to relay event to the Master.

IO Script Processor.

IO Script Processor 60 of the slave, or IO Script Processor 44 of the master, executes (or stops) an IO Script. It overwrites the first several bytes of data in the write buffers with information to provide virtual storage identification in each disk block before the data is written to the vLun by the server. It also interfaces to the Event Service to log any event.

Data Verify Processor.

Data Verify Processor 46 of the master calls the Management Processor to get the VSX configuration (virtual to physical mapping). It verifies the data from the servers was correctly mapped onto the physical devices. It interfaces to the Event Service to log any event.

VSX Tester Flow

Once the test environment is configured and powered up, the VSX Tester is started on the Master Host and associated agents are started on the Slave Hosts. The VSX Tester on the Master initializes the tester, creates a database (if not found), discovers all the devices and updates the database with the devices found and their relevant information as shown in the flow diagram of FIG. 5.

Thereafter, the tester starts executing the Master Script that is written to follow the vLUN states shown in FIG. 6. Note: for simplicity this figure does not show error, reporting, etc. states.

Further details of the tester are set forth in provisional application Ser. No. 60/317,817 filed Sep. 7, 2001, entitled "Method and Apparatus for Processing Fiber Channel Frames at Wire Speed," the disclosure of which is hereby incorporated herein by reference.

As will be understood by those of skill in the art, the present invention may be embodied in other specific forms without departing from the essential characteristics thereof. For example, the slave testers could have direct connections to the disks, and it could be ethernet instead of fibre channel. Accordingly, the foregoing description is intended to be illustrative, but not limiting, of the scope of the invention which is set forth in the following claims.

What is claimed is:

1. An apparatus for testing a network-based storage virtualization system comprising:
    a tester, coupled to a host side of said storage virtualization system, and configured to provide test scripts to said storage virtualization system;
    a separate link, independent of said storage virtualization system, to a storage side of said storage virtualization system; and
    said tester being configured to verify, over said separate link, a physical configuration of VLUNs and data written to the VLUNs by the tester on storage devices.

2. The apparatus of claim 1 wherein said separate link is a fibre channel link to a storage network connecting said storage virtualization system to storage devices.

3. The apparatus of claim 1 wherein said tester is a master tester, and further comprising:
    at least one slave tester, configured to receive a test script from said master tester, to provide test data from a connection different from a connection of said master tester to said host side of said storage virtualization system.

4. The apparatus of claim 3 wherein said tester is configured to create a key for said slave tester to write to storage devices, said key being a unique pattern identifying said slave tester.

5. The apparatus of claim 4 wherein said key includes a WWN of said slave tester, a VLUN ID, a data pattern ID and a time stamp.

6. The apparatus of claim 1 wherein said tester is configured to
    (a) discover devices connected to and in said network-based storage virtualization system;
    (b) determine the composition of VLUNs in said system;
    (c) test said system using scripts.

7. The apparatus of claim 4 wherein said scripts are chosen based up a discovered configuration of said devices and said VLUNs.

8. An apparatus for testing a network-based storage virtualization system comprising:
    a master tester, coupled to a host side of said storage virtualization system, and configured to provide test scripts to said storage virtualization system;
    a separate link, independent of said storage virtualization system, between said master tester and a storage side of said storage virtualization system;

said master tester being configured to verify, over said separate link, a physical configuration of VLUNs and data written to the VLUNs on storage devices;

at least one slave tester, configured to receive a test script from said master tester, to provide test data from a connection different from a connection of said master tester to said host side of said storage virtualization system;

wherein said tester is configured to create a key for said slave tester to write to storage devices, said key being a unique pattern identifying said slave tester; and wherein said master tester is configured to (a) discover devices connected to and in said network-based storage virtualization system, (b) determine the composition of VLUNs in said system, and (c) test said system using scripts.

9. The apparatus of claim 8 wherein said host side and said storage side are connected to said storage virtualization system through the same port.

* * * * *